United States Patent [19]

Mardigian

[11] Patent Number: 5,123,599
[45] Date of Patent: Jun. 23, 1992

[54] APPARATUS AND PROCESS FOR RECLAIMING WOOD FROM DEBRIS

[76] Inventor: Henry C. Mardigian, 601 Beaufait, Detroit, Mich. 48207

[21] Appl. No.: 667,199

[22] Filed: Mar. 11, 1991

[51] Int. Cl.[5] ............................................. B02C 23/10
[52] U.S. Cl. ................................... 241/20; 241/24; 241/28; 241/79.1; 209/17; 209/173
[58] Field of Search ................. 241/20, 24, 28, 79.1, 241/DIG. 38; 209/17, 3, 172, 172.5, 173

[56] References Cited

U.S. PATENT DOCUMENTS

| | | | |
|---|---|---|---|
| 2,403,910 | 7/1946 | Christiansen | 241/24 |
| 3,086,718 | 4/1963 | Lukas, Jr. | 241/24 |
| 3,802,631 | 4/1974 | Boyd | 241/20 |
| 4,325,819 | 4/1982 | Altizer | 209/10 |
| 4,353,509 | 10/1982 | Bostian, Jr. | 241/24 |

Primary Examiner—Frank T. Yost
Assistant Examiner—John M. Husar
Attorney, Agent, or Firm—Krass & Young

[57] ABSTRACT

Wood is reclaimed from demolition debris in a process that includes a vibratory feeder 12 feeding material to a hammer mill 16 which comminutes the debris into fragments that are then fed to a disk screen 22. Debris fragments below a predetermined size are fed to a trommel 28. The trommel sorts small debris particles under a second smaller predetermined size, directing smaller particles to a first waste conveyor. Intermediately sized debris fragments between the first and second predetermined size pass through the outlet of the trommel to a sink float tank 48 in which the non-wood waste debris fragments that sink are transported away by a second waste conveyor 52 and floating wood debris fragments are recovered out of the tank 48 by conveyor 50.

12 Claims, 1 Drawing Sheet

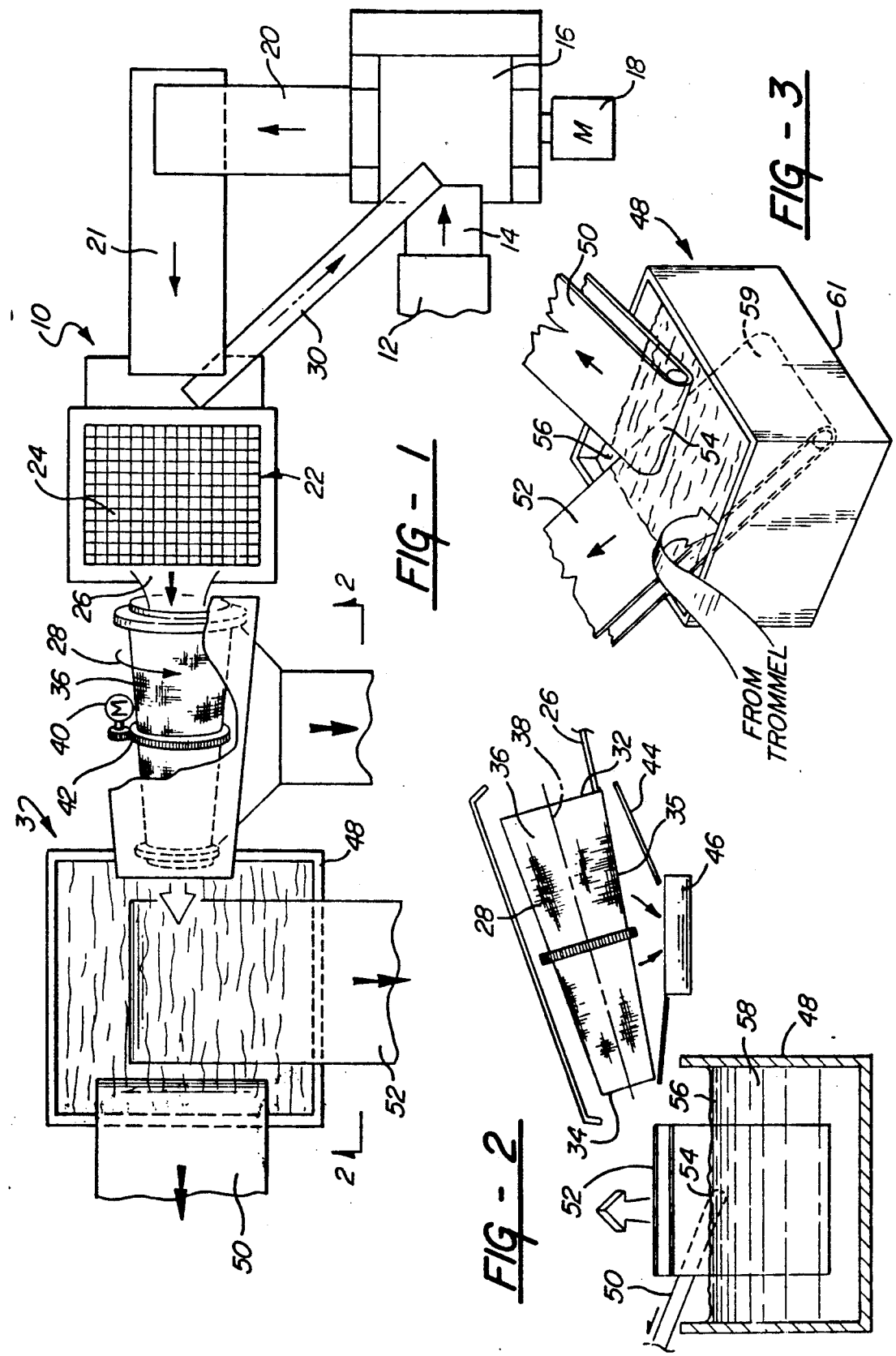

APPARATUS AND PROCESS FOR RECLAIMING WOOD FROM DEBRIS

TECHNICAL FIELD

The present invention relates to debris separation and more particularly to a process and apparatus for reclaiming combustible wood products from demolition debris.

BACKGROUND OF THE INVENTION

The rising cost of fossil fuel and its uncertain availability in conjunction with the rising cost of landfill disposal of debris has made it economically and ecologically feasible to reclaim used wood from debris produced by demolition of buildings and other structures for reuse as fuel.

Processes for reclaiming used wood from debris are known in the art. Most commonly, the raw debris is introduced into a sink float tank in order to effect separation of floating combustible material such as wood from heavier non-burnable materials such as metal or bricks. The known processes that use sink float tanks have several disadvantages. Firstly, the sink float tanks can only be used on certain types of debris that contain a small proportion of heavier debris relative to the wood debris. Furthermore, the heavier debris must be in relatively small pieces. In order for the tanks to receive large pieces, the size of the tank must increase dramatically. Often, reclamation centers use multiple numbers of large tanks to match capacity with the other reclamation apparatus. The large tanks take up a large amount of space and also use large quantities of water in a relatively short period of time.

What is needed is a process and apparatus which efficiently reclaims used wood from demolition debris but which eliminates the need for multiple number of large tanks so that wood reclamation can be accomplished in a facility of reduced size. What is also needed is a reclaiming process that operates on a reduced amount of water.

SUMMARY OF THE INVENTION

In accordance with one aspect of the invention, debris is first vibrated such that any unburnable coats of paint or other coatings adhered to the wood are vibrated off. The debris then enters a comminutor such as a hammer mill which fragments the debris into pieces. The fragmented debris is then transferred to a first sorter which allows fragments under a first predetermined size to pass to a second sorter. Fragments above said predetermined size are returned to the mill for further fragmentation. The second sorter further sorts the debris into particles sized under a second predetermined size which is substantially smaller than said first predetermined size. The particles under said second predetermined size are transported away as waste. Intermediately sized fragments between the first and second predetermined sizes are transferred to a sink float tank. The tank is filled with water or similar liquid having a specific gravity greater than wood that allows wood to float. Heavier fragments such as metal or brick fragments sink in the liquid. The sunken fragments are transported away as waste. Floating combustible wood fragments are recovered from the tank to be later processed into briquets, artificial logs or the like.

Preferably the first sorter is a vibrating disk screen. The vibrated and fragmented debris material is passed onto the disk screen. A return conveyor is located at a lower end of the disk screen to transport debris chunks that are greater than the first predetermined size back to the hammer mill. In one embodiment, an inclined chute is located under the disk screen to direct fragments under the first predetermined size to the second sorter.

Preferably the second sorter is a screened rotating trommel that rotates and tumbles the debris fragments. Preferably the trommel is tapered such that its inlet is larger than its outlet. The trommel is inclined such that its bottom surface is inclined downwardly toward its smaller outlet.

The debris fragments are introduced into the inlet of the trommel. Material that passes through the trommel screen can be generally characterized as finely comminuted particles of material produced by the hammer mill. Material such as gypsum, plaster board and dried paint passing through the hammer mill tend to get pulverized into particles. The particles are transported away by a first waste conveyor, located under the trommel. Intermediately sized fragments of wood, metal and brick are diverted from the inlet to the outlet through the trommel while the trommel rotates. The intermediately sized fragments are further sorted by the sink float tank into which they fall from the trommel outlet. The fragments that sink are continuously transported away by a second waste conveyor having its upstream end submerged under the surface of the water. The wood fragments that float are continuously transported away by a conveyor having its upstream end positioned near the water surface.

In this way, the sink float tank can be substantially smaller than sink float tanks of the prior art. Firstly, no large objects are introduced into the sink float tank. Secondly, most smaller particles which would tend to clog up the tank and the water usable are presorted out through the trommel as waste product.

BRIEF DESCRIPTION OF THE DRAWINGS

Reference now is made to the following drawings in which:

FIG. 1 is a top plan schematic view of an apparatus for reclaiming used wood from demolition debris according to the preferred embodiment of the present invention;

FIG. 2 is a fragmentary and partially sectional side elevational view of the trommel and sink float tank taken along lines 2—2 shown in FIG. 1; and FIG. 3 is a top perspective view of the sink float tank and associated conveyors shown in FIG. 1.

DETAILED DESCRIPTION OF THE PREFERRED EMBODIMENT

Referring particularly to FIG. 1, a wood reclamation system 10 includes a vibratory feeder 12 which receives debris such as demolition debris from buildings which have a wood content. The wood debris often has nails embedded therein or paint and other coatings adhered thereon. The vibratory feeder 12 is a conventional device used to vibrate the paint and other coatings off of the wood surface. The vibratory feeder 12 feeds the debris to a conveyor 14 which in turn delivers debris to a hammer mill 16. The hammer mill 16 is driven by a motor 18 in a conventional fashion. The hammer mill 16 is capable of comminuting the debris into fragments smaller than 2 ½ inches in dimension. Materials such as gypsum board, plaster, and paint chips are pulverized into particles much smaller than 2 ½" by the hammer mill 16. The comminuted debris is passed to an assembly of conveyors 20,21 which delivers the fragments to a disk screen assembly 22.

The disk screen assembly 22 has a screen 24 that vibrates. The screen is sized to allow fragmented debris under 2 ½ inches in dimension to pass therethrough to an inclined chute 26 thereunder. The chute 26 directs the fragments to a trommel 28. Oversized fragments that did not pass through the screen 24 are returned to the hammer mill 16 via a conveyor 30. Hammer mill 16 reprocesses the oversized fragments received from conveyor 30. Although many geometries are possible for screen 24, conveyor 21, and conveyor 30; one simple geometry is to have conveyor 21 empty out onto a high edge of screen 24 and return conveyor 30 can be situated at a low edge of screen 24. As screen 24 vibrates, the oversized fragments eventually move down screen 24 and onto conveyor 30 to be returned to hammer mill 16.

The trommel 28 as shown in FIGS. 1 and 2 is a tapered drum having a larger inlet 32 and smaller outlet 34. The trommel 28 has its central longitudinal axis 38 inclined such that its lowered surface section 35 inclines downwardly from large inlet 32 to smaller outlet 34. Debris from chute 26 enters inlet 32. The trommel is lined with a screen mesh 36 sized to pass debris particles that are under ½ inch in dimension. The trommel 28 is rotated about its central longitudinal axis 38 via motor 40 and a conventional gear assembly 42 The debris particles under the ½ inch dimension such as the pulverized plaster, gypsum board, and paint chips pass through the trommel screen 36 as the trommel 28 rotates and tumbles the debris received in inlet 32. A bottom housing 44 is inclined to direct the small debris particles to a first waste conveyor 46 which transports the debris particles away. Intermediately sized debris fragments that enter inlet 32 but do not pass through the trommel screen 36 eventually tumble out through the lower outlet 34 and fall into a sink float tank 48. Although differently size trommels may be built for various capacities, a trommel being 5 feet wide in its middle and 32 feet long set at a 5° incline and spinning at 90 rpm is believed to have adequate capacity and successfully function to sort out debris fragments larger than ½ inch from debris particles less than ½ inch.

Referring now to FIGS. 1 through 3, the sink float tank 48 has two conveyors 50 and 52 extending therefrom. Conveyor 50 has its lower end 54 in the water 58 near its surface 56. Conveyor 52 has its lower end 59 submerged toward the bottom 61 of the tank 48 below the surface 56 of water 58. The conveyors 50 and 52 extend orthogonally from each other out of the tank 48. The conveyor 50 extends away from the tank in a direction aligned with the longitudinal direction of trommel 28. The conveyor 52 extends in a perpendicular direction therefrom.

The intermediately sized debris fragments that are heavier than water, such as chunks of brick or metal, sink toward the bottom of the sink float tank 48, land on the submerged portion of conveyor 52, and are transported out of the tank as waste by conveyor 52. Any floating wood fragments are picked up by conveyor 50 and transported out of the sink float tank 48 to be later processed in any desired fashion, i.e., compressed into combustible artificial logs or briquets. The wood fragments floating in the tank are directed toward conveyor 50 by the pushing action of new debris falling into the tank from the trommel outlet 34. As the wood is pushed onto lower upstream end 54, it is then picked up and conveyed out of tank 48. While the size of the tank is dependent upon the capacity desired, a ten foot cubic tank is adequate for the above described trommel.

The reclamation process is continuous as long as demolition debris is fed to the vibratory feeder 12. The tank receives virtually no small particles or large objects in relation to the quantity of intermediately sized fragments that it receives from the trommel outlet 34. The tank no longer needs to be sized to receive large objects because of the comminution of the debris beforehand. The tank also does not need to have the capacity to work with large amounts of particulate matter because smaller particles are presorted by the trommel and directed to the waste conveyor 46. Consequently, the tank can be downsized and the water therein does not have to be constantly changed resulting in the substantially reduced use of water compared to tanks found in prior art sink float methods. Furthermore, the downsizing of the tank provides for significant space savings. In previous methods, the tank accounted for nearly half of the needed space for the sorting and debris reclamation methods.

In this fashion, an apparatus and process reclaims combustible wood from demolition debris of various shapes, sizes, and kinds. The reclamation of combustible wood is accomplished in a reliable and efficient manner reducing the amount of waste to a landfill and reducing the amount of used water.

Other variations and modifications of the present invention are possible without departing from its scope and spirit as defined by the appended claims.

The embodiments of the invention in which an exclusive property or privilege is claimed are defined as follows:

1. A process for separating wood from debris utilizing comminuting, sink float, and sorting techniques characterzied in the that the debris is first comminuted; thereafter comminuted debris of a size greater than and smaller than a predetermined size range is sorted out of the comminuted debris; and thereafter the comminuted debris of the predetermined size range is dumped into a tank filled with a stagnant quantity of liquid having a specific gravity greater than that of wood so as to allow the wood fraction in the comminuted and sized debris to float on the surface of the liquid and allow the non-wood fraction in the comminuted and sized debris to sink to the bottom of the tank.

2. A process according to claim 1 wherein the floating wood fraction is recovered from the tank by conveyor means having a loading end position proximate the surface of the liquid in the tank and the sunken non-wood fraction is recovered from the tank by further conveyor means having a loading end positioned proximate the bottom of the tank.

3. A process as defined in claim 1 further characterized by vibrating said debris sufficiently to separate dried paint coats from said wood before said debris in comminuted.

4. An apparatus for separating wood from debris utilizing comminuting, sink float, and sorting techniques characterized in that the apparatus includes:
   a comminutor for fragmenting the debris;
   sorting means receiving the fragmented debris from the comminutor and operative to sort out communited debris of a size greater than and lesser than a predetermined size range;

sink float means, including a fixed sink float tank filled with a stagnant quantity of liquid having a specific gravity greater than that of wood, receiving the comminuted debris of the predetermined size range and operative to allow the wood fraction of the comminuted and sized debris to float on top of the liquid in the tank and allow the non-wood fraction of the comminuted and sized debris to sink to the bottom of the tank; and transport means operative to continuously remove the floating wood fraction from the surface of the liquid and continuously remove the non-wood fraction from the bottom of the tank.

5. An apparatus as defined in claim 4 wherein:

said sorting means includes a trommel having an inlet and outlet, said trommel being rotatable along a longitudinal axis and positioned such that debris moves downwardly from said inlet to said outlet as the rotating trommel rotates and tumbles the debris;

said sorting means further includes screening means receiving the comminuted debris from the comminutor and operative to remove debris of a size greater than said predetermined size range;

said inlet receiving the sorted debris, from said first sorter;

said trommel being screened to sort out debris of a size greater than said predetermined size range; and said outlet being positioned to deliver debris of said predetermined size range to said sink float tank.

6. An apparatus as defined in claim 5 wherein:

said trommel is tapered and has its inlet larger than its outlet; and said trommel has its longitudinal axis inclined downwardly from its inlet to its outlet.

7. An apparatus as defined in claim 6 wherein:

said apparatus further includes means for vibrating dried paint from said wood before said wood is fragmented by said comminutor.

8. An apparatus as defined in claim 4 wherein:

said transport means comprise a first endless conveyor having a loading end positioned proximate the surface of the liquid in the tank for removal of the floating wood fraction and a second endless conveyor having a loading end positioned proximate the bottom of the tank for removal of the sunken non-wood fraction.

9. An apparatus as defined in claim 8 wherein:

said sorting means includes a trommel rotatable along longitudinal axis and having its outlet lower section positioned lower than its inlet lower section such that the trommel's bottom surface is inclined downwardly from its inlet to its outlet;

said sorting means further including screening means receiving the comminuted debris from the comminutor and operative to remove debris of a size greater than said predetermined size range;

said trommel inlet receiving the sorted debris from said first sorter;

said trommel being screened to sort out debris of a size greater than said predetermined size range; and said trommel outlet positioned to deliver debris of said predetermined size range to said sink float tank.

10. An apparatus as defined in claim 9 wherein:

said trommel is tapered and has its inlet larger than its outlet; and said trommel has its longitudinal axis inclined downwardly from its inlet to its outlet.

11. An apparatus as defined in claim 10 wherein:

said apparatus further includes means for vibrating dried paint from said wood before said wood is fragmented by said comminutor.

12. An apparatus as defined in claim 5 wherein:

said apparatus further includes means for vibrating dried paint from said wood before said wood is fragmented by said comminutor.

* * * * *